United States Patent
Huang et al.

(10) Patent No.: US 10,234,639 B2
(45) Date of Patent: Mar. 19, 2019

(54) PRESSING CLEANER FOR AN OPTICAL CONNECTOR'S END FACE

(71) Applicant: Hobbes & Co., Ltd., New Taipei (TW)

(72) Inventors: Yen-Chang Huang, New Taipei (TW); Tse-Kang Huang, New Taipei (TW)

(73) Assignee: HOBBES & CO., LTD., New Taipei (TW)

( * ) Notice: Subject to any disclaimer, the term of this patent is extended or adjusted under 35 U.S.C. 154(b) by 351 days.

(21) Appl. No.: 15/154,652

(22) Filed: May 13, 2016

(65) Prior Publication Data

US 2017/0329091 A1 Nov. 16, 2017

(51) Int. Cl.
*G02B 6/38* (2006.01)
*B08B 3/02* (2006.01)
*B08B 1/04* (2006.01)

(52) U.S. Cl.
CPC ............ *G02B 6/3866* (2013.01); *B08B 1/04* (2013.01); *B08B 2240/02* (2013.01)

(58) Field of Classification Search
CPC ......... B08B 3/02; B08B 1/04; B08B 2240/02; G02B 6/3866
See application file for complete search history.

(56) References Cited

U.S. PATENT DOCUMENTS

| | | | | |
|---|---|---|---|---|
| 4,733,428 A * | 3/1988 | Malinge | ............... | B08B 3/02 15/302 |
| 5,906,686 A * | 5/1999 | McNeil | ............... | B08B 3/12 134/1 |
| 7,971,304 B2 * | 7/2011 | Kida | ............... | B08B 11/00 15/210.1 |
| 8,087,118 B2 * | 1/2012 | Fujiwara | ............... | B08B 1/00 15/210.1 |
| 8,266,755 B2 * | 9/2012 | Nakane | ............... | B08B 1/04 15/210.1 |
| 8,402,587 B2 * | 3/2013 | Sugita | ............... | G02B 6/3866 15/210.1 |
| 8,959,695 B2 * | 2/2015 | Cunningham | ............... | B08B 1/008 15/210.1 |
| 9,134,485 B2 * | 9/2015 | Fujiwara | ............... | G02B 6/3866 |
| 9,433,978 B2 * | 9/2016 | Huang | ............... | B65H 57/26 |
| 9,776,231 B2 * | 10/2017 | Martini | ............... | B21B 45/02 |
| 2002/0131748 A1 * | 9/2002 | Sato | ............... | G02B 6/25 385/134 |

(Continued)

*Primary Examiner* — Marc Carlson
(74) *Attorney, Agent, or Firm* — Chun-Ming Shih

(57) ABSTRACT

A pressing cleaner for an optical connector's end face includes a housing, a support unit fixed inside the housing, a feeding unit which is opposite to the support unit and held and moved in the housing; the feeding unit is pivotally fitted at a rotary unit ahead, the rotary unit is provided with a cleaning head at the front side, the cleaning head is equipped with a pressing surface ahead, and the feeding unit allows a cleaning wire to be stretched and wound around the cleaning head as well as the pressing surface externally; the rotary unit includes a worm shaft on which guiding slots are opened wherein the guiding slots correspond to pins in the front of the support unit for holding the pins inside the guiding slots; an optical connector's end face is cleaned by the cleaning wire when the pressing surface is activated and the rotary unit is driven via the pins and the guiding slots for rotations.

7 Claims, 10 Drawing Sheets

(56) References Cited

U.S. PATENT DOCUMENTS

| | | | |
|---|---|---|---|
| 2003/0098045 A1* | 5/2003 | Loder | B08B 1/00 134/8 |
| 2006/0191091 A1* | 8/2006 | Kida | B08B 1/00 15/210.1 |
| 2007/0023067 A1* | 2/2007 | Kida | B08B 11/00 134/6 |
| 2010/0043159 A1* | 2/2010 | Fujiwara | B08B 1/00 15/97.1 |
| 2011/0047731 A1* | 3/2011 | Sugita | G02B 6/3807 15/97.1 |
| 2012/0066849 A1* | 3/2012 | Fujiwara | B08B 1/00 15/97.1 |
| 2015/0378109 A1* | 12/2015 | Samal | G02B 6/3809 385/58 |

* cited by examiner

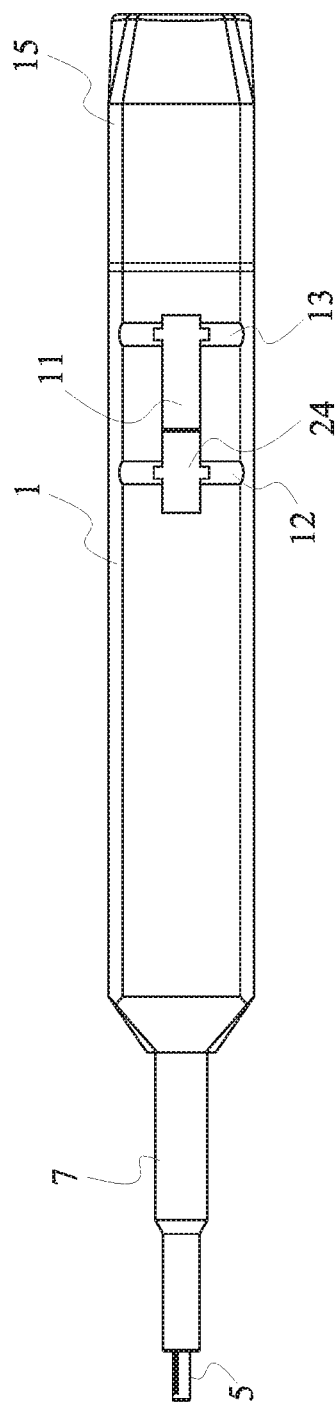
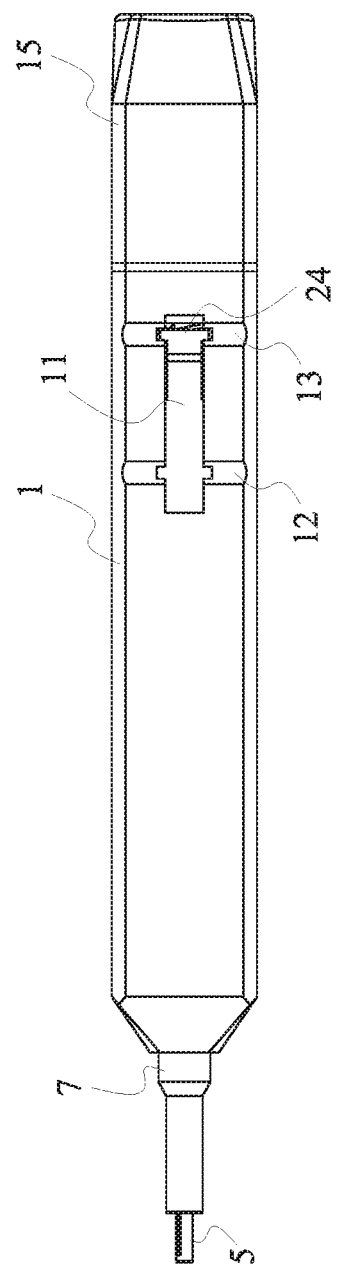
FIG. 5
FIG. 6

PRESSING CLEANER FOR AN OPTICAL CONNECTOR'S END FACE

BACKGROUND OF THE INVENTION

1. Field of the Invention

The present disclosure relates to applications of a cleaner for an optical connector, particularly a pressing cleaner for an optical connector's end face which features easy operation, smooth and reliable cleaning, less malfunction, a replaceable and reusable cleaning wire, and reduced operation cost.

2. Description of the Prior Art

In applications of optical links, the optical connector is an important device which is intended for fast convenient connection of optical fiber cables as well as smooth light and data transmissions between two connected cables.

To link optic fiber cables, the optical connector must be installed or removed in the course of laying and using optic fiber cables. During installation or removal of an optical connector, the optical connector's end face may be overlaid by dust or greasy dirt which disrupts or hinders light transmission, weakens transmission quality, or even induces mistakes.

These issues initiate a necessary procedure to clean the end face of an optical connector which is to be installed or removed.

It is not an easy task to clean an optical connector because most existing optical connector cleaners with complex configurations are not operated easily.

As shown in Patent U.S. Pat. No. 8,087,118 B2, an optical connector cleaning tool classified into an advanced technique is a compact device which is more convenient to an operator and available to most optical connectors for reliable cleaning.

The optical connector cleaning tool in the prior art, however, still has some drawbacks in its configuration and needs to be corrected:

1. The optical connector cleaning tool is based on an important drive mechanism with an insertion protuberance 54 embedded into a cam groove 85 for driving and rotating a rotary tube part 82. However, the force concentrated at one point and not distributed uniformly induces the drive mechanism to be enabled unstably and jammed.

2. The optical connector cleaning tool with various constitutional units is uneconomic in manufacturing and characteristic of the complex shape of each compact constitutional unit particularly, which malfunctions usually and is difficultly fabricated and replaced or maintained with all single constitutional units assembled.

3. The cleaning efficiency is not good enough because a cleaning wire in the optical connector cleaning tool is not sheltered but covered with dust easily.

4. The cleaning efficiency is limited because a cleaning wire in the optical connector cleaning tool is available to dry cleaning but not effective in removing hardened or heavy dirt.

In summary, the drawbacks of the optical connector cleaning tool such as poor cleaning efficiency, complex manufacturing process, malfunction not corrected in troubleshooting, and used cleaning wire not replaced independently but repurchased aggravate a user's financial burden.

Thus, it can be seen that the optical connector cleaning tool needs to be corrected in its configuration by people skilled in the art.

The applicant, who familiarized himself with the configuration of the optical connector cleaning tool for some corrective measures, has studied innovative techniques proactively in long-term research, development and practice and presents a pressing cleaner for an optical connector's end face herein.

SUMMARY OF THE INVENTION

A pressing cleaner for an optical connector's end face provided in the present disclosure is operated easily, stably and correctly for cleaning most optical connectors effectively.

A pressing cleaner for an optical connector's end face provided in the present disclosure is characteristic of better cleaning efficiency and integrated with a wet cleaning mechanism for updating the cleaning function.

A pressing cleaner for an optical connector's end face provided in the present disclosure features simplified configuration, less malfunction, a cleaning wire easily removed and replaced, reusability, reduced operation cost, environmental friendship and fewer consumables.

A pressing cleaner for an optical connector's end face in the present disclosure comprises a housing, a support unit fixed inside the housing, and a feeding unit which is opposite to the support unit and held in the housing. The feeding unit is pivotally fitted at a rotary unit ahead; the rotary unit is provided with a cleaning head at the front side; the cleaning head is equipped with a pressing surface ahead; the feeding unit and the support unit are rearwards provided with a reset spring in between.

The feeding unit, which is moved inside the housing, allows a cleaning wire to be stretched through the rotary unit and wound around the cleaning head and the pressing surface externally; the rotary unit, which is activated for rotations relative to the feeding unit, drives the cleaning head to rotate and the pressing surface to clean an optical connector's end face with the cleaning wire.

The rotary unit comprises a worm shaft on which guiding slots are opened; the guiding slots correspond to pins in the front of the support unit for holding the pins inside the guiding slots. When the pressing surface contacts and is resisted by an optical connector's end face, the feeding unit is activated for movement relative to the support unit and the rotary unit is driven via the pins and the corresponding guiding slots for rotations; the feeding unit is retracted by the reset spring and stays at an original position when the pressing surface is separated from the optical connector's end face.

BRIEF DESCRIPTION OF THE DRAWINGS

FIG. 5 is a schematic plan view of a snap-fit fastener held in a fastening hole at the front side;

FIG. 6 is a schematic plan view of a snap-fit fastener held in a fastening hole at the rear side;

DETAILED DESCRIPTION OF THE PREFERRED EMBODIMENT

Figure 1:
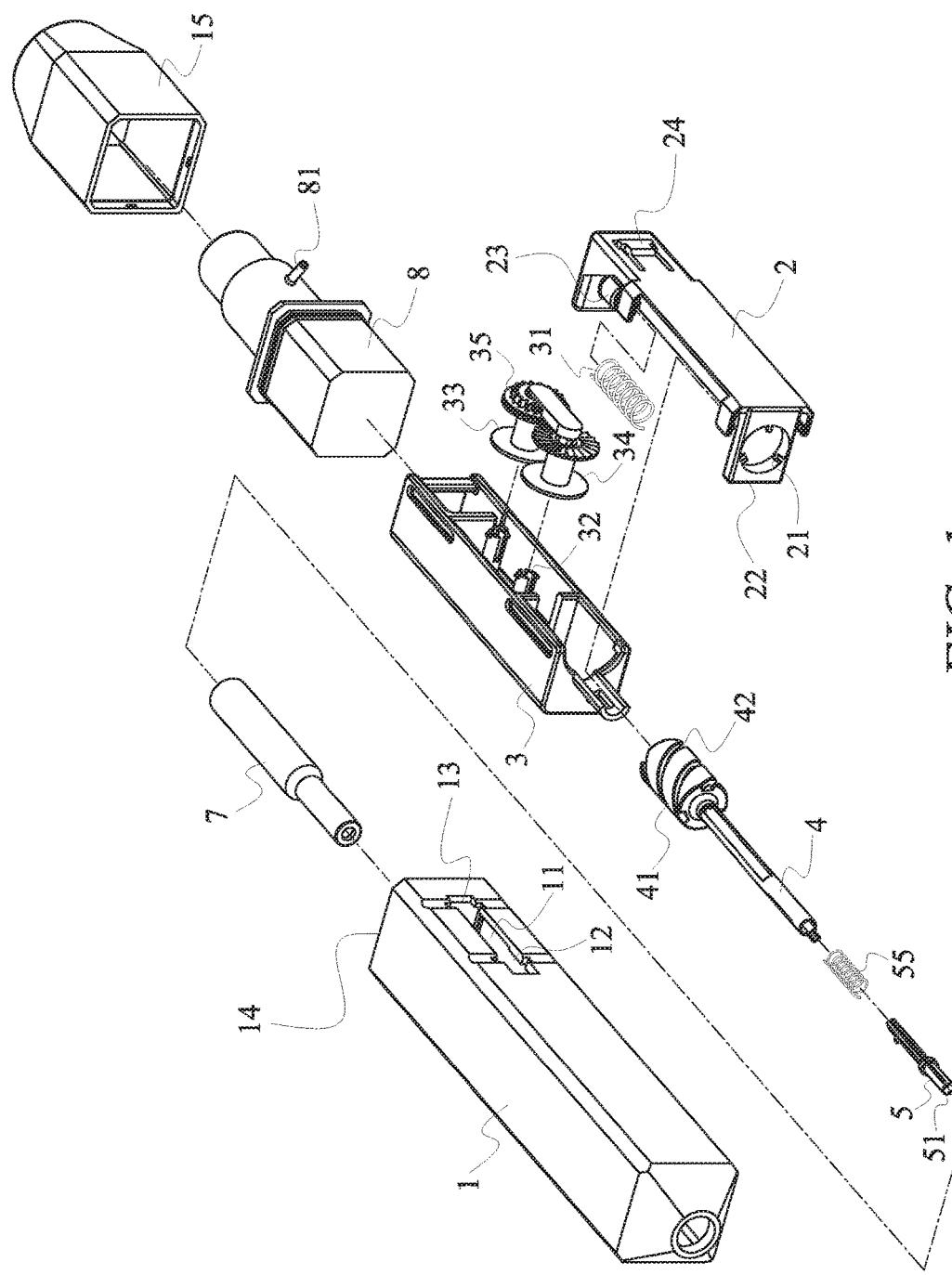
FIG. 1 is an exploded perspective view of a pressing cleaner for an optical connector's end face.
Figure 2:
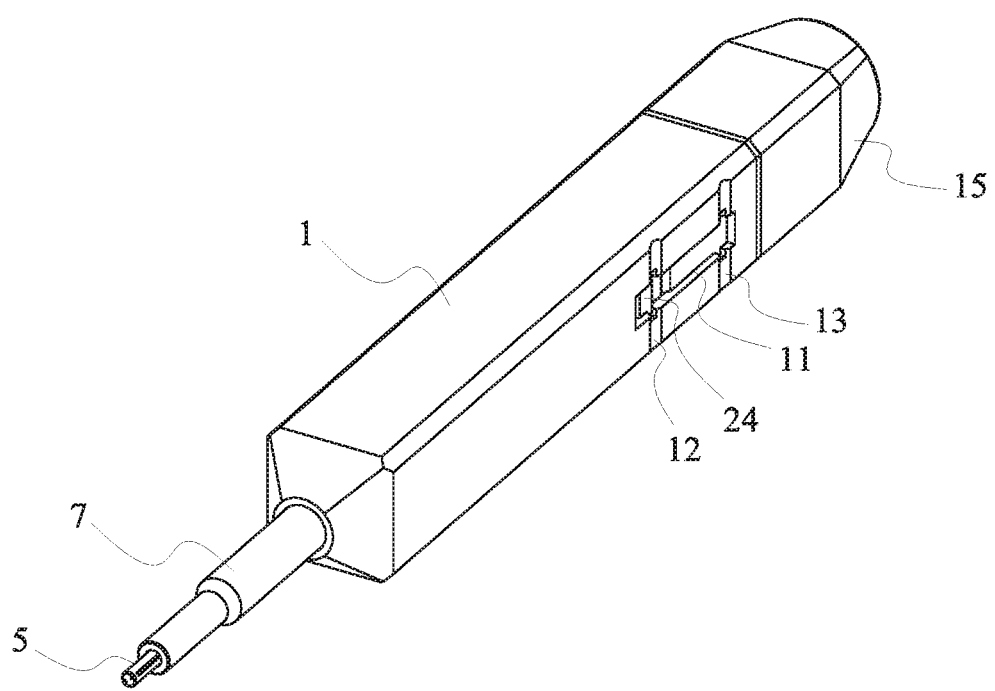
FIG. 2 is a perspective view of a pressing cleaner for an optical connector's end face which is assembled.
Figure 3:
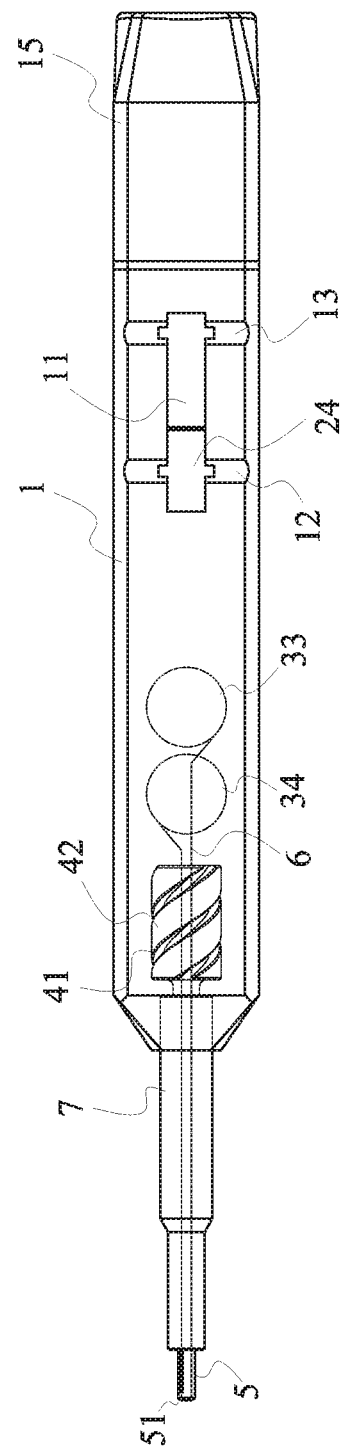
FIG. 3 is a schematic plan view of a pressing cleaner for an optical connector's end face.
Figures 4, 4A:
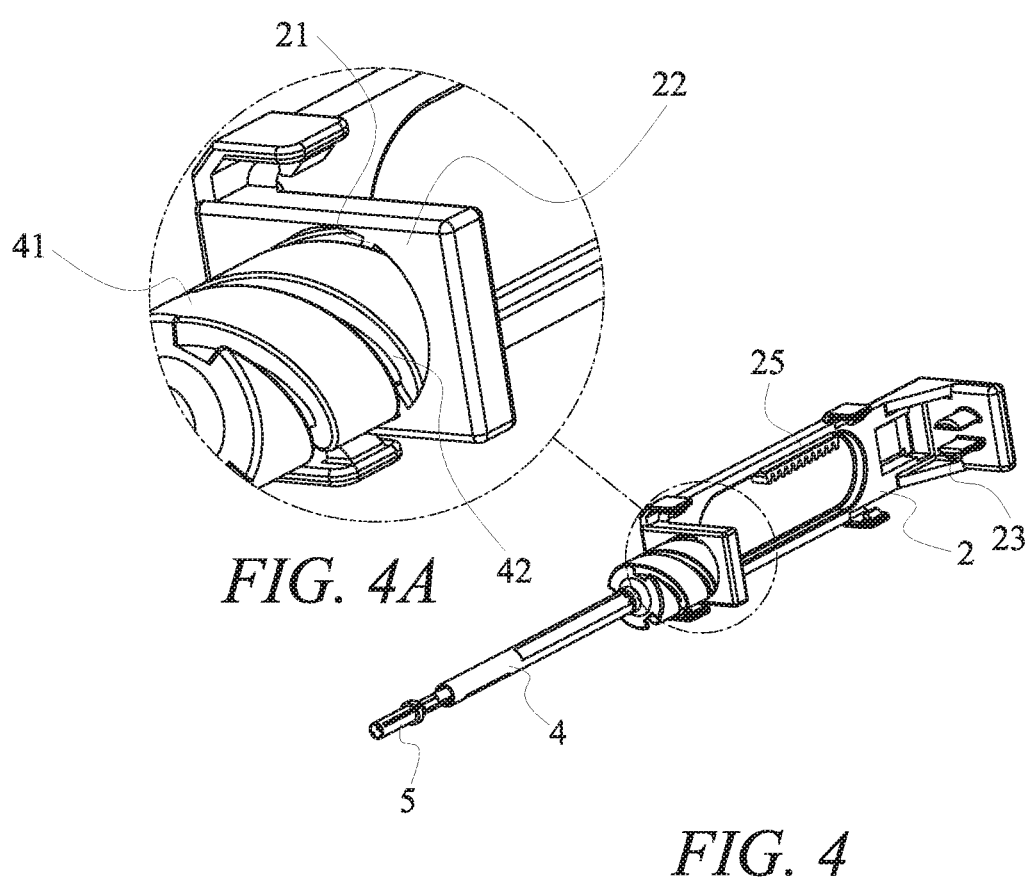
FIG. 4 is a perspective view which illustrates both a support unit and a rotary unit are assembled.
FIG. 4A is an enlarged perspective view of a detail of the assembly shown in FIG. 4.

Referring to FIG. 1 to FIG. 4A, which illustrate a pressing cleaner for an optical connector's end face comprises a housing 1 to be grasped by an operator, a support unit 2 fixed inside the housing 1, and a feeding unit 3 which is opposite to the support unit 2 and held and moved in the housing 1.

The feeding unit 3 is pivotally fitted at a rotary unit 4 ahead; the rotary unit 4 is provided with a cleaning head 5 at the front side which is driven by the rotary unit 4 to activate rotations relative to the feeding unit 3.

The cleaning head 5 comprises a pressing surface 51 at the front side; both the cleaning head 5 and the pressing surface 51 are externally wound by a cleaning wire 6 which is extracted from the feeding unit 3 and penetrates the rotary unit 4; the rotary unit 4 comprises a worm shaft 41 on which guiding slots 42 are opened; the guiding slots 42 correspond to pins 21 in the front of the support unit 2 for holding the pins 21 inside the guiding slots 42. When the pressing surface 51 contacts and is resisted by an optical connector's end face (not shown in figures), the feeding unit 3 is activated for movement relative to the support unit 2 and the rotary unit 4 is driven via the pins 21 and the corresponding guiding slots 42 for rotations. As such, an optical connector's end face is cleaned by the cleaning wire 6 which surrounds the pressing surface 51. The feeding unit 3 is retracted by a reset spring 31, which is installed at rear sides of the feeding unit 3 and the support unit 2, and stays at an original position after the pressing surface 51 is separated from the optical connector's end face.

Figure 7:
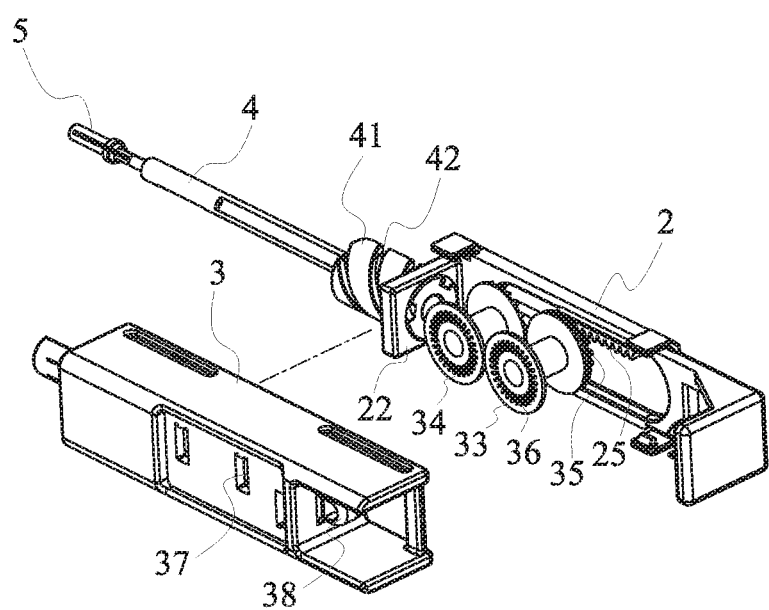
FIG. 7 is a perspective view which illustrates relative positions among a wire reel, a wire feeding shaft and a support unit with the wire feeding shaft and the support unit disassembled.
Figure 10:
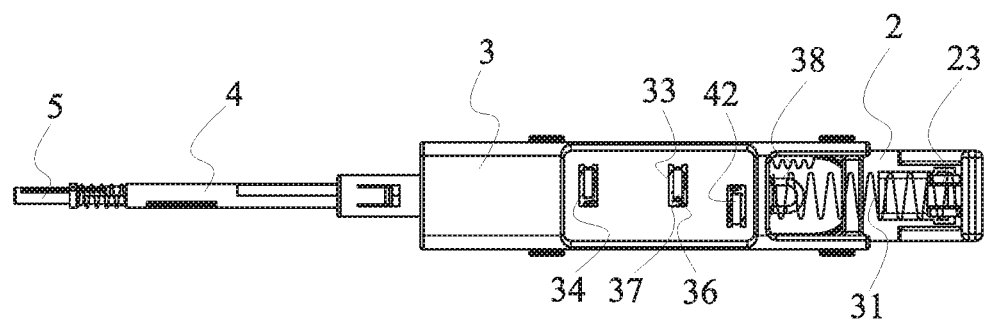
FIG. 10 is a plan view which illustrates both a feeding unit and a support unit are assembled and the feeding unit overtops the support unit.

The support unit 2 is provided with a fixing collar 22 at the front side which surrounds the rotary unit 4 peripherally and comprises the pins 21 around its inner diameter. In the present disclosure, the support unit 2 includes, without limitation, three pins 21 which are distributed uniformly and correspond to the three guiding slot 42 for forces applied at multiple points stably but no jam. The support unit 2 comprises a rearward extending convex pillar 23 at which the reset spring 31 is fixed; the fixing collar 22, the convex pillar 23 and the support unit 2 are manufactured integrally wherein the support unit 2 is easily disassembled for replacement of the cleaning wire 6. Moreover, referring to FIGS. 7 and 10 that illustrate the feeding unit 3 comprises a rearward extending convex pillar 38 which coordinates the convex pillar 23 to position the reset spring 31 in tandem.

Referring to FIGS. 5 and 6 that illustrate the support unit 2 exteriorly comprises a snap-fit fastener 24 to be held in a corresponding fastening hole 12 in the front of the groove 11 on the housing 1 on which two fastening holes 12, 13 are opened and is fixed at the front side of the housing 1. Alternatively, the snap-fit fastener 24 can be freely moved inside the groove 11 and held in the fastening hole 13 at the rear end so that the support unit 2 is fixed at the rear side of the housing 1 for an adjustable relative position between the support unit 2 and the housing 1 as well as a variable spatial arrangement inside the housing 1.

In practice, a containing socket 14 in the back of the housing 1 is exposed for placement of an auxiliary cleaning tool 8 when the snap-fit fastener 24 is held in the fastening hole 12 in the front of the groove 11; alternatively, the snap-fit fastener 24 is held in the fastening hole 13 in the back of the groove 11 for a compact and portable pressing cleaner when the auxiliary cleaning tool 8 is removed.

Referring to FIGS. 1, 3, 7, 10 and 11, which illustrate the feeding unit 3 comprises two shaft levers 32. Each of the two shaft levers 32 allows a wire reel 33 and a wire feeding shaft 34 to be inserted inside and rotated thereon. The cleaning wire 6 initially is idle and wound on the wire feeding shaft 34 has a stretchable end which is guided through the cleaning head 5 and coiled at the wire reel 33; the wire reel 33 provided with a gear disc 35 toward the support unit 2 is driven by a gear rack 25, which is installed on the support unit 2 and engaged with the gear disc 35, and the cleaning wire 6 on the wire feeding shaft 34 is retracted and held in the wire reel 33 via the cleaning head 5 when the feeding unit 3 is activated for movement relative to the support unit 2; each of the wire reels 33 or each of the wire feeding shafts 34 comprises uniformly distributed cutting slots 36 on a wall facing the feeding unit 3 and corresponding to fastening dots 37 on the wall of the feeding unit 3 wherein the fastening dots 37 are held in the cutting slots 36 for stabilizing rotations of the wire reel 33 and the wire feeding shaft 34 and keeping the cleaning wire 6 stretched correctly.

Figure 8:
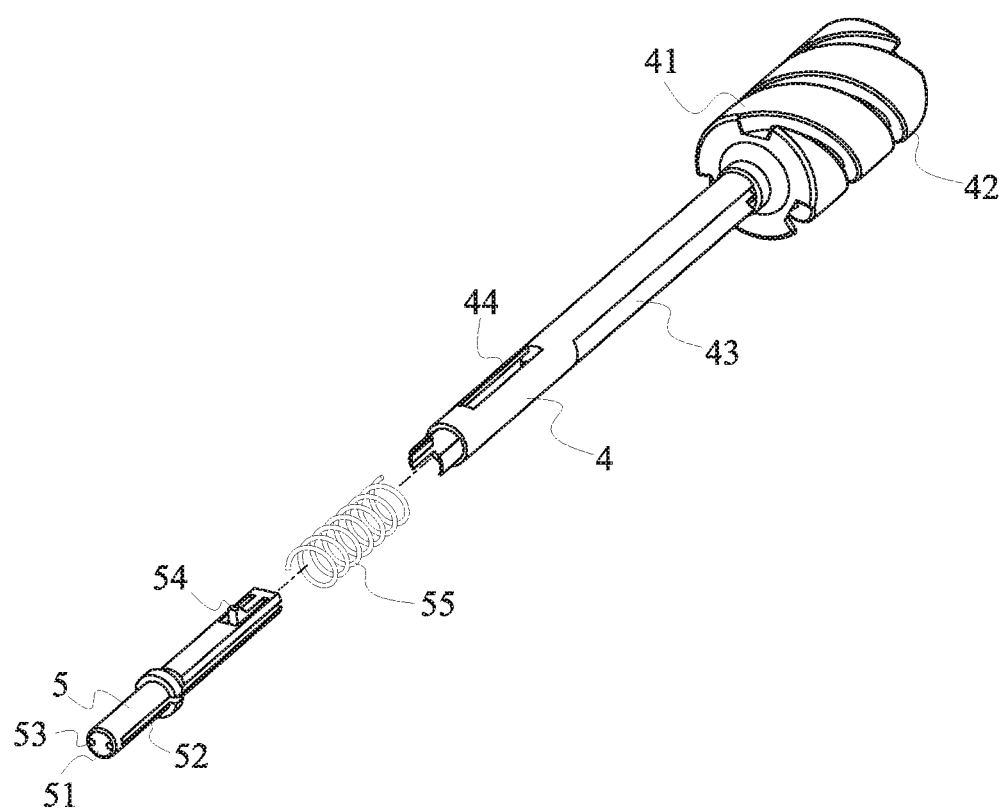
FIG. 8 is a perspective view which illustrates a cleaning wire with a rotary unit and a cleaning head disassembled.
Figure 9:
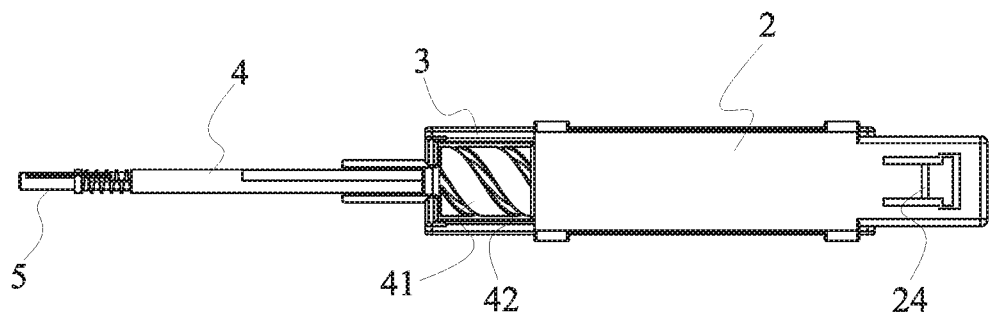
FIG. 9 is a plan view which illustrates both a feeding unit and a support unit are assembled and the support unit overtops the feeding unit.
Figure 11:
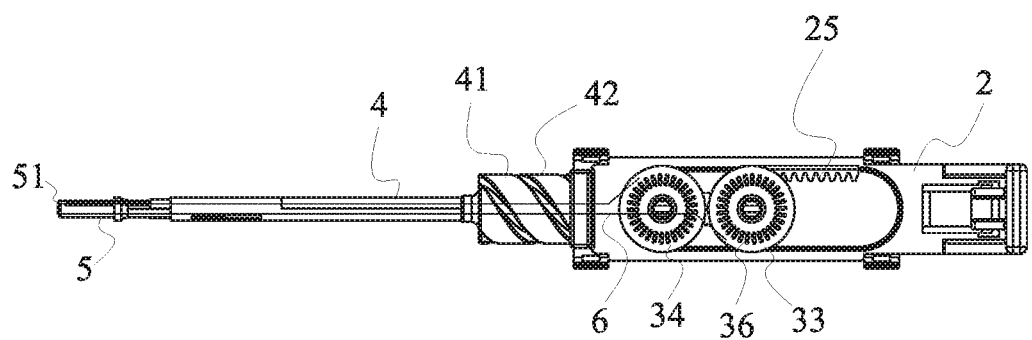
FIG. 11 is a schematic plan view which illustrates a cleaning wire within a feeding unit, a support unit and a rotary unit is activated for rolls.

Referring to FIGS. 8 and 11, which illustrate the rotary unit 4 comprises straight slots 43, each of which is opened at one side and extended inside the worm shaft 41, and the cleaning head 5 comprises slits 52, each of which is opened at one side and extended to the pressing surface 51 for development of a pinhole 53. As such, the cleaning wire 6 extracted from the interior of the worm shaft 41 is stretched inside the slits 52 on the cleaning head 5 along the straight slots 43 and kept at the level lowered than surfaces of the rotary unit 4 and the cleaning head 5 for stable operation and cleaning with the cleaning wire 6 along the slits 52 penetrating the pinholes 53 and exposed to the exterior of the pressing surface 51.

The cleaning head 5 comprises a protuberance 54 at the rear side which is fastened into a slot 44 opened on the rotary unit 4 for connection of the cleaning head 5 and the rotary unit 4 and rotation of the cleaning head 5 driven by the rotary unit 4; the slot 44 which is opened to a certain extent allows the protuberance 54 to be moved inside, coordinating the protuberance 54 and the rotary unit 4 to hold a buffer spring 55 in between and perform cleaning when the optical connector's end face contacts the pressing surface 51 of the cleaning head 5 that is driven by the rotary unit 4 for rotations.

Figure 12:
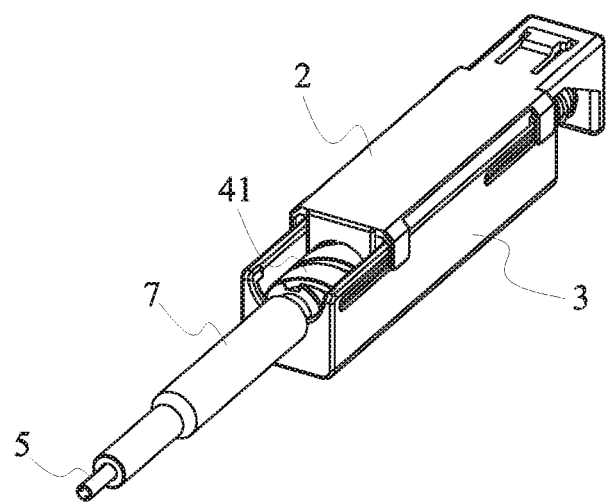
FIG. 12 is a schematic view which illustrates both a support unit and a feeding unit are assembled hermetically for cleanness of a cleaning wire.

Referring to FIGS. 1 and 12, which illustrate both the wire reel 33 and the wire feeding shaft 34 are installed on the feeding unit 3 and the support unit 2 is covered on the feeding unit 3 for development of a sealed device. The support unit 2, which drives the cleaning wire 6 to roll, further shields the wire reel 33 and the wire feeding shaft 34 from above for neither dust or greasy dirt over the cleaning wire 6 nor jam weakening cleaning effect. Moreover, both the rotary unit 4 and the cleaning head 5 are externally covered with a sheath 7 for neither dust nor greasy dirt over the cleaning wire 6

Figure 13:
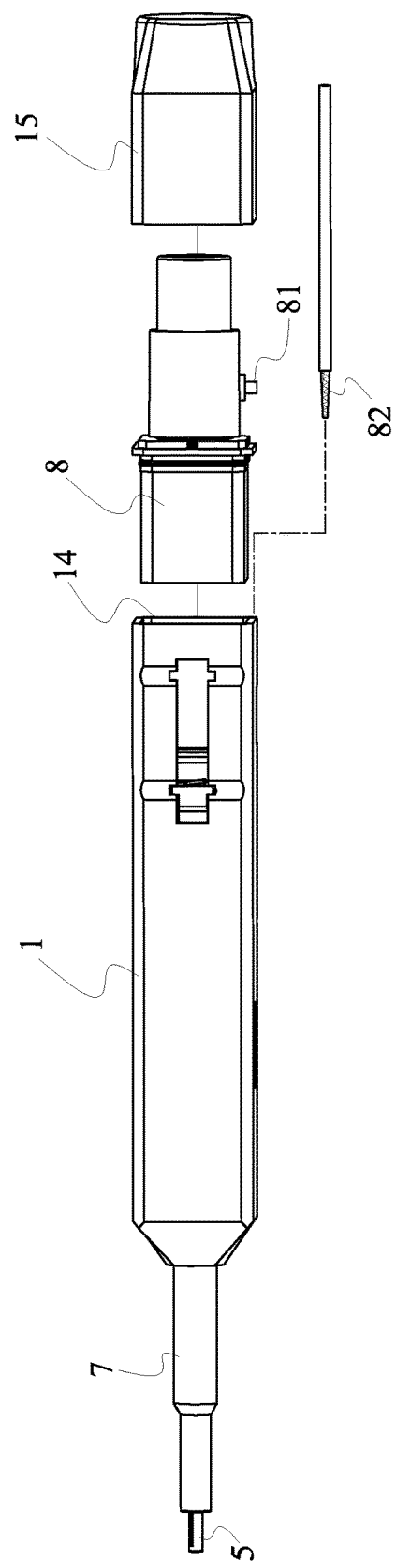
FIG. 13 is a schematic plan view which illustrates an auxiliary cleaning tool is exposed when a cap is removed.

Referring to FIGS. 1 and 13 that illustrate the housing 1 comprises the containing socket 14 at the rear side in which the auxiliary cleaning tool 8 is placed and a cap 15 is externally covered on the containing socket 14. In practice, the auxiliary cleaning tool 8 comprises a liquid detergent, a nozzle 81 from which the liquid detergent is ejected, and an optical-connector cleaning rod 82 in contrast to the cleaning wire 6 that is used in dry cleaning mostly without obvious cleaning effect on hardened or thick dirt; the liquid detergent, which is sprayed on the optical-connector cleaning rod 82 and further the optical connector's end face, is effective in removing heavy dirt for better cleaning efficiency. Furthermore, the optical-connector cleaning rod 82 which is characteristic of an elongated shape and held in the housing 1 is a convenient and portable tool.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A pressing cleaner for an optical connector's end face, comprising a housing, a support unit fixed inside the housing, and a feeding unit which is opposite to the support unit and held in the housing wherein the feeding unit is pivotally fitted at a rotary unit ahead, the rotary unit is provided with a cleaning head at the front side, the cleaning head is equipped with a pressing surface ahead, and both the feeding unit and the support unit are rearwards provided with a reset spring in between;

the feeding unit, which is moved inside the housing, allows a clean thread to be stretched through the rotary unit and wound around the cleaning head as well as the pressing surface externally and the rotary unit, which is activated for rotations relative to the feeding unit, drives the cleaning head to rotate and the pressing surface to clean an optical connector's end face with the clean thread;

the rotary unit comprises a worm shaft on which guiding slots are opened wherein the guiding slots correspond to pins in the front of the support unit for holding the pins inside the guiding slots, the feeding unit is activated for movement relative to the support unit and the rotary unit is driven via the pins and the corresponding guiding slots for rotations with the pressing surface contacting and resisted by an optical connector's end face, and the feeding unit is retracted by the reset spring and stays at an original position with the pressing surface separated from the optical connector's end face;

wherein the support unit exteriorly comprises a snap-fit fastener to be moved inside a groove, which is opened on the housing, and positioned in a corresponding fastening hole of the groove on which two fastening holes at front and rear sides are opened;

wherein the housing comprises a containing socket at the rear side in which an auxiliary cleaning tool is placed with the snap-fit fastener held in a fastening hole at the front side; the containing socket is covered with a cap externally.

2. A pressing cleaner for an optical connector's end face as claimed in claim 1 wherein the support unit is provided with a fixing collar at the front side, which surrounds the rotary unit peripherally and comprises the pins around the inner diameter, more than one pin corresponds to more than one guiding slot, the support unit comprises a rearward extending convex pillar at which the reset spring is fixed, and the fixing collar, the convex pillar and the support unit are manufactured integrally.

3. A pressing cleaner for an optical connector's end face as claimed in claim 1 wherein the rotary unit comprises straight slots, each of which is opened at one side and extended inside the worm shaft, and the clean thread extracted from the interior of the worm shaft is stretched to the cleaning head along the straight slots.

4. A pressing cleaner for an optical connector's end face as claimed in claim 1 wherein: the feeding unit comprises two shaft levers, each of which allows a wire reel and a wire feeding shaft to be inserted inside; the clean thread coiled at the wire feeding shaft has one end wound around the wire reel through the cleaning head; the wire reel, which is provided with a gear disc toward the support unit, and the conjoint clean thread are driven by a gear rack, which is installed on the support unit and engaged with the gear disc, with the feeding unit activated for movement relative to the support unit; each of the wire reels or each of the wire feeding shafts comprises cutting slots on a wall facing the feeding unit and corresponding to fastening dots on the wall of the feeding unit for stabilized rotations of the wire reel and the wire feeding shaft when the fastening dots are held in the cutting slots.

5. A pressing cleaner for an optical connector's end face as claimed in claim 1 wherein: the cleaning head comprises slits, each of which is opened at one side and extended to the pressing surface for development of a pinhole; the clean thread along the slits penetrates the pinholes and is exposed to the exterior of the pressing surface; the cleaning head comprises a protuberance at the rear side which is fastened into a slot on the rotary unit for connection of the cleaning head and the rotary unit and moved inside the slot; the slot coordinates the protuberance and the rotary unit to hold a buffer spring in between so that the pressing surface which contacts the optical connector's end face is driven by the rotary unit for rotations.

6. A pressing cleaner for an optical connector's end face as claimed in claim 1 wherein the auxiliary cleaning tool comprises a liquid detergent and an optical-connector cleaning rod and the liquid detergent is sprayed on the optical-connector cleaning rod and further the optical connector's end face for better cleaning efficiency.

7. A pressing cleaner for an optical connector's end face as claimed in claim 1 wherein both the rotary unit and the cleaning head are externally covered with a sheath.

* * * * *